Figure 1:
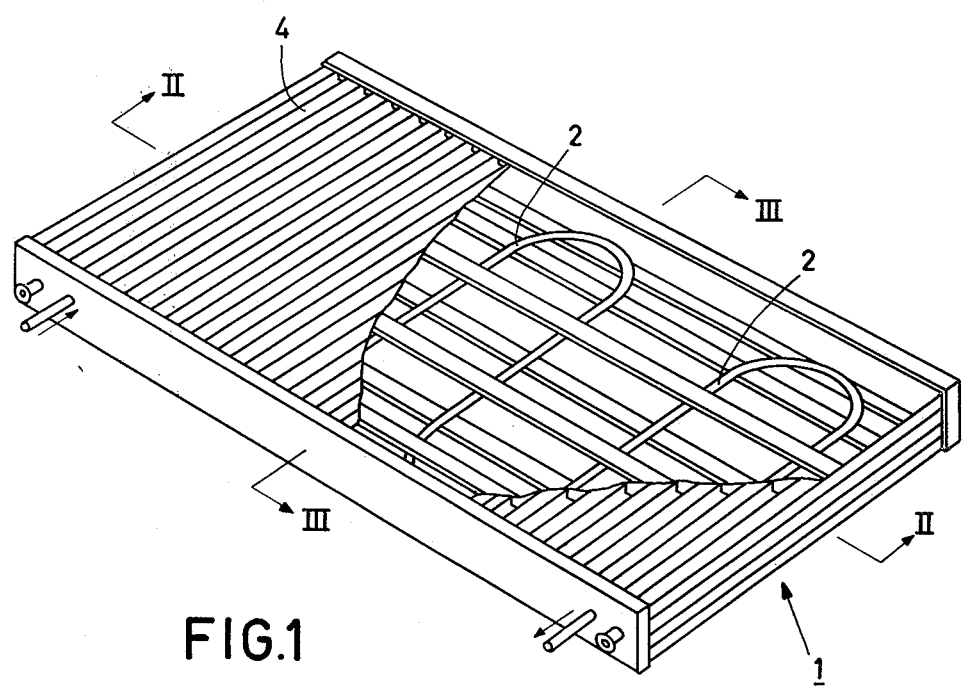

United States Patent [19]

Schröder

[11] 4,324,287
[45] Apr. 13, 1982

[54] THERMAL STORAGE DEVICE

[75] Inventor: Johann Schröder, Aachen, Fed. Rep. of Germany

[73] Assignee: U.S. Philips Corporation, New York, N.Y.

[21] Appl. No.: 84,044

[22] Filed: Oct. 12, 1979

[30] Foreign Application Priority Data

Oct. 28, 1978 [DE] Fed. Rep. of Germany ....... 2846988

[51] Int. Cl.³ ............................................. F28D 21/00
[52] U.S. Cl. ....................................... 165/10; 165/81; 252/70
[58] Field of Search ................... 165/104 S, 81, 10 A; 252/70

[56] References Cited

U.S. PATENT DOCUMENTS 3,720,198  3/1973  Laing et al. ......................... 126/400
4,189,393  2/1980  Schroder et al. .

FOREIGN PATENT DOCUMENTS 2550106  5/1976  Fed. Rep. of Germany ........ 252/70

Primary Examiner—Albert W. Davis
Attorney, Agent, or Firm—Thomas A. Briody; William J. Streeter; Rolf E. Schneider

[57] ABSTRACT

The increase in volume of a heat storage medium comprising water or a first eutectic mixture of water and a salt hydrate, when such storage medium passes from the liquid to the solid state, is prevented from occurring by adding 1 to 6% by volume of a second water-salt hydrate eutectic having a lower freezing point to the storage medium.

3 Claims, 3 Drawing Figures

THERMAL STORAGE DEVICE

This invention relates to a thermal storage device, having a reservoir which is filled with water or a eutectic mixture of water and a salt hydrate as the heat storage medium, and having heat exchange walls.

For the storage of latent heat the change in heat content which occurs when a storage medium passes from the solid phase into the liquid phase or vice versa is utilized. However, for most storage media the phase transition is usually accompanied by a change in volume, so that the walls of the heat exchanger and the reservoir are subject to great mechanical forces and the thermal contact is disturbed.

The volume of the majority of storage media, for example the volume of salt hydrates, increases at the transition point from the solid phase to the liquid phase. In this case the problem can be solved by storing the storage medium in flat storage reservoirs having corrugated relatively thin walls consisting of metal or a synthetic resin material. Such flat storage reservoir (or storage plates) can be stacked in a simple manner to form units (storage units) of any arbitrary size. The heat exchange may be effected by means of an internal heat exchanger as well as via the surfaces of the storage plates. As the walls of the plates have a corrugated profile, they are flexible but at the same time of a high mechanical stability and they require a minimum of material. However, such a storage plate may only be kept horizontally or in a slightly sloping position, to ensure a uniform expansion of the storage medium in the entire plate.

Although this measure is sufficient for the majority of storage media, a further difficulty is met when water or a eutectic mixture of water with a salt hydrate is utilized. These storage media, when used for cooling purposes, expand by some percentage by volume (water, for example, by 8%) when they pass into the solid state. As both cooling and recrystallization of the storage medium never take place uniformly over the entire storage plate, the transition to the solid state occurs non-uniformly producing local crystallization areas. It sometimes happens that water is enclosed in such local crystallization areas. During the continuing transition to the solid state and the increase of volume, this locally entrapped water through small cracks or channels in the crystallization area is locally forced with a very high pressure against the wall of the plate. Such water crystallizes against the wall of the plate at a further increase of volume. The increase in pressure and volume confined to small areas then produces local bulging and, finally, damage to the walls of the plate.

A cold storage device having a eutectic mixture of water and a salt or a salt hydrate as the storage medium is known from United Kingdom Pat. No. 1,531,953. As eutectic mixtures of water and salt hydrates which are known per se from the literature, this patent mentions 64 g $MgSO_4.7H_2O$ per 100 g of water (freezing point $-5.2°$ C.) and 84 g $MgCl_2.6H_2O$ per 100 g of water (freezing point $-33.6°$ C.) and 143 g $CaCl_2.6H_2O$ per 100 g of water (freezing point $-55°$ C.).

Problems arising from the above-mentioned change in volume are not discussed.

From U.S. Pat. No. 3,744,272 it is known that the eutectic material $NaCl.Na_2SO_4.10H_2O$ (freezing point $13°$ C.) used in a cooling device does not damage its reservoir as the result of expansion when it passes into the solid state, because of its expansion characteristic. U.S. Pat. No. 3,921,961 describes a eutectic cooling solution of approximately 2 kg of water and approximately 500 g of potassium chloride to which approximately 1 to 2% (20 to 40 g) of glycerine is added to reduce the problems caused by the expansion on solidifying of the solution.

It is an object of the present invention to enable the use of comparatively thin reservoir walls also for cold storage devices of the type mentioned above.

According to the invention this is accomplished by the fact that the heat storage medium contains, in addition to the first eutectic mixture, 1 to 6% by volume and, preferably, 3 to 5% by volume of a second eutectic mixture of water and a salt hydrate, whose freezing point is lower than that of the pure storage medium.

Surprisingly, it appears that the admixture according to the invention causes the crystallization and the increase of volume to occur uniformly over the entire storage plate. Even after many hundreds of storage cycles local bulging of the plate walls does not occur.

Figure 2:
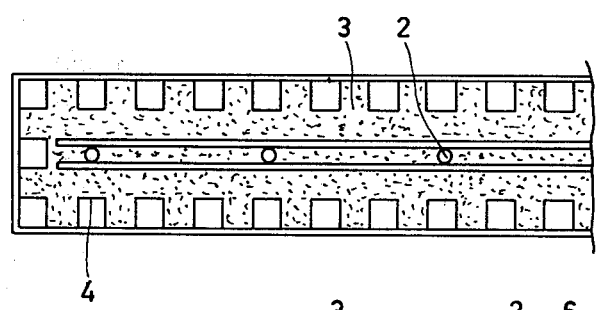
Figure 3:
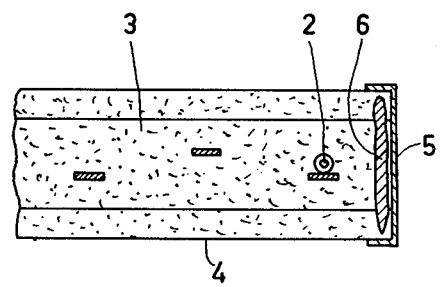

The invention will now be further explained with reference to the accompanying drawing, in which FIG. 1 shows a perspective view, partially broken away, of a flat heat storage vessel, FIG. 2 shows a portion of a longitudinal section of the storage vessel taken along line II—II in FIG. 1, FIG. 3 shows a portion of a cross-section of the storage vessel taken along line III—III in FIG. 1.

The thermal storage container or vessel 1 includes a heat exchanging tube 2. The vessel 1 is filled with water or a eutectic mixture of water and a salt hydrate as the storage medium 3, which contains, for the homogenization of the crystallization, 1 to 6% by volume of a eutectic mixture of water and a salt hydrate having a lower melting point. Without this admixture the medium passes into the solid state very inhomogeneously. The admixed storage medium recrystallizes very uniformly, the volume of the storage vessel 1 also increasing uniformly over its entire surface. Local bulging is no longer observed.

Experiments were made with a storage vessel 1 having walls 4 consisting of synthetic resin film or of metal foil of 0.05 to 0.5 mm thickness. The corrugated walls 4 of the storage vessel 1 are flexible and therefore follow the changes in volume of the storage medium 3, which occur at the phase transition, so that a high stability and, simultaneously, a proper thermal contact between the storage medium 3 and the storage vessel walls 4 are retained. The flat storage vessels described in this example have two comparatively rigid side walls 5 to ensure that they are self-supporting also in the longitudinal direction, and that they can easily be stacked to form larger storage units. However as these walls are only slightly flexible, they can be slowly pushed outwards when the storage medium has many times passed from the liquid state into the solid state. Although after many storage cycles no critical bulging but only a slight uniform curvature of these walls 5 was observed, it is advisable to avoid this disadvantageous effect completely by means of the following simple measure:

A strip 6 of rubber or another elastic material is adhered or otherwise fastened to the inside of the side walls. The expansion of the storage medium 3 at the transition point to the solid state is neutralized in this way, and that of the side walls 5 is avoided completely.

The following Table contains examples of storage media which are very suitable for cooling purposes and examples of eutectic mixtures having a lower melting point which may be combined with such media.

| Storage medium | F.P. °C. | Admixture of 1 to 6 vol. % | F.P. °C. |
|---|---|---|---|
| $H_2O$ | ±0 | $H_2O$ + 3.92 wt. % $NaF$ | −3.5 |
| $H_2O$ | ±0 | $H_2O$ + 9.5 wt. % $NH_4HCO_3$ | −3.9 |
| $H_2O$ | ±0 | $H_2O$ + 32.4 wt. % $NaH_2PO_4$ | −9.9 |
| $H_2O$ | ±0 | $H_2O$ + 19.6 wt. % $NH_4Cl$ | −16.0 |
| $H_2O$ | ±0 | $H_2O$ + 22.4 wt. % $NaCl$ | −21,2 |
| $H_2O$ + 5.93 wt. % $Na_2CO_3$ | −2.1 | $H_2O$ + 16.5 wt. % $KHCO_3$ | −5.43 |
| $H_2O$ + 5.93 wt. % $Na_2CO_3$ | −2,1 | $H_2O$ + 38.33 wt. % $K_3PO_4$ | −24 |
| $H_2O$ + 9.66 wt. % $KNO_3$ | −2.85 | $H_2O$ + 32.4 wt. % $Mg(NO_3)_2$ | −31.9 |
| $H_2O$ + 9.5 wt. % $NH_4HCO_3$ | −3.9 | $H_2O$ + 19.5 wt. % $NH_4Cl$ | −16 |
| $H_2O$ + 16.5 wt. % $KHCO_3$ | −5.43 | $H_2O$ + 38.33 wt. % $K_3PO_4$ | −24 |
| $H_2O$ + 16.5 wt. % $KHF_2$ | −7.6 | $H_2O$ + 21.8 wt. % $KF$ | −21.5 |
| $H_2O$ + 32.4 wt. % $NaH_2PO_4$ | −9.9 | $H_2O$ + 38.33 wt. % $K_3PO_4$ | −24 |
| $H_2O$ + 19.34 wt. % $KCl$ | −10.7 | $H_2O$ + 38.33 wt. % $K_3PO_4$ | −24 |
| $H_2O$ + 19.34 wt. % $KCl$ | −10.7 | $H_2O$ + 20.6 wt. % $MgCl_2$ | −33.6 |
| $H_2O$ + 36.78 wt. % $K_2HPO_4$ | −13 | $H_2O$ + 38.33 wt. % $K_3PO_4$ | −24 |
| $H_2O$ + 23.6 wt. % $NH_4HF_2$ | −14.8 | $H_2O$ + 21.8 wt. % $KF$ | −21.5 |
| $H_2O$ + 19.5 wt. % $NH_4Cl$ | −16 | $H_2O$ + 21.2 wt. % $NaCl$ | −21.2 |
| $H_2O$ + 39.7 wt. % $(NH_4)_2SO_4$ | −18.5 | $H_2O$ + 20.6 wt. % $CaCl_2$ | −49.8 |
| $H_2O$ + 22.4 wt. % $NaCl$ | −21.2 | $H_2O$ + 30.2 wt. % $CaCl_2$ | −49.8 |
| $H_2O$ + 38.33 wt. % $K_3PO_4$ | −24 | $H_2O$ + 20.6 wt. % $CaCl_2$ | −49.8 |
| $H_2O$ + 32.5 wt. % $NH_4F$ | −26.5 | $H_2O$ + 56 wt. % $NaClO_4$ | −32 |
| $H_2O$ + 30.5 wt. % $Al(NO_3)_3$ | −27 | $H_2O$ + 32.4 wt. % $Mg(NO_3)_2$ | −31.9 |
| $H_2O$ + 42.9 wt. % $Ca(NO_3)_2$ | −28.9 | $H_2O$ + 32.4 wt. % $Mg(NO_3)_2$ | −31.9 |
| $H_2O$ + 32.4 wt. % $Mg(NO_3)_2$ | −31.9 | $H_2O$ + 20.6 wt. % $CaCl_2$ | −49.8 |
| $H_2O$ + 20.6 wt. % $MgCl_2$ | −33.6 | $H_2O$ + 20.6 wt. % $CaCl_2$ | −49.8 |
| $H_2O$ + 30.2 wt. % $CaCl_2$ | −49.8 | $H_2O$ + 51 wt. % $ZnCl_2$ | −62 |

What is claimed is:

1. A thermal storage device comprising a container filled with a heat storage medium comprising (1) water or a first eutectic mixture of water and a salt hydrate and (2) 1 to 6% by volume of a second eutectic mixture of water and a salt hydrate, the freezing point of component (2) being below the freezing point of component (1).

2. A thermal storage device according to claim 1, in which the heat storage medium contains 3 to 5% by volume of the second eutectic mixture of water and a salt hydrate.

3. A thermal storage device according to claim 1 or 2, in which the container has two oppositely disposed relatively rigid side walls, and which includes a strip of an elastic material arranged adjacent the inside surface of each side wall.

* * * * *